United States Patent
Adhikesavan et al.

(10) Patent No.: US 11,874,858 B2
(45) Date of Patent: *Jan. 16, 2024

(54) PROCESSING TECHNIQUES FOR DATABASE TRANSACTION REQUESTS WITH OPERATIONS DEFINED BY DIFFERENT ORM LIBRARIES

(71) Applicant: PayPal, Inc., San Jose, CA (US)

(72) Inventors: Rajasudharsan Adhikesavan, San Jose, CA (US); Jaykumar Patel, San Jose, CA (US); Nikhil Sharma, Milpitas, CA (US); Alwin Joseph, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,167

(22) Filed: Sep. 12, 2022

(65) Prior Publication Data
US 2023/0004585 A1    Jan. 5, 2023

Related U.S. Application Data

(63) Continuation of application No. 16/804,407, filed on Feb. 28, 2020, now Pat. No. 11,442,965.

(51) Int. Cl.
*G06F 16/00* (2019.01)
*G06F 16/28* (2019.01)
(Continued)

(52) U.S. Cl.
CPC ............ *G06F 16/288* (2019.01); *G06F 9/466* (2013.01); *G06F 16/212* (2019.01); *G06F 16/252* (2019.01)

(58) Field of Classification Search
CPC ...... G06F 16/288; G06F 9/466; G06F 16/212; G06F 16/252; G06F 16/289
See application file for complete search history.

(56) References Cited

U.S. PATENT DOCUMENTS 7,941,469 B2 *   5/2011   Grossfeld ............... G06F 9/505
                                                      707/968
8,046,376 B2 *  10/2011   Seitz .................. G06F 16/24552
                                                      715/239
(Continued)

OTHER PUBLICATIONS

Kisman et al., "Hibernate ORM query simplification using hibernate criteria extension (HCE)", Oct. 31, 2016, IEEE, pp. 1-6 (Year: 2016).

*Primary Examiner* — Alexander Khong
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed relating to processing database transactions that include application operations defined by different object relational mapping (ORM) libraries. A transaction router module executing on a computer system receives, from an application, a request for a first database transaction, where the first database transaction includes first and second application operations. The transaction router module then translates the first application operation to one or more first database operations using a first ORM library and the second application operation to one or more second database operations using a second ORM library. Then, the transaction router module determines one or more database connections for the one or more first database operations and the one or more second database operations. Such techniques may advantageously allow applications to switch between using different persistence frameworks and message broker frameworks without substantial adjustments to application code.

20 Claims, 7 Drawing Sheets

(51) Int. Cl.
*G06F 9/46* (2006.01)
*G06F 16/25* (2019.01)
*G06F 16/21* (2019.01)

(56) References Cited

U.S. PATENT DOCUMENTS

| | | | |
|---|---|---|---|
| 8,515,949 B2 | 8/2013 | Seitz et al. | |
| 9,037,493 B2* | 5/2015 | Shah | G06Q 10/00 |
| | | | 705/28 |
| 2005/0149907 A1* | 7/2005 | Seitz | G06F 12/128 |
| | | | 717/108 |
| 2009/0063559 A1* | 3/2009 | Rhodes | G06F 16/258 |
| 2009/0144696 A1* | 6/2009 | Andersen | G06F 16/289 |
| | | | 717/109 |
| 2009/0248739 A1* | 10/2009 | Cao | G06F 16/289 |
| 2009/0259683 A1* | 10/2009 | Murty | G06F 16/284 |
| 2010/0082646 A1* | 4/2010 | Meek | G06F 16/252 |
| | | | 707/752 |
| 2010/0287208 A1* | 11/2010 | Mao | G06F 16/288 |
| | | | 707/804 |
| 2011/0270857 A1* | 11/2011 | Bommireddipalli | |
| | | | G06F 16/24564 |
| | | | 707/E17.014 |
| 2012/0124080 A1* | 5/2012 | Willard | G06F 16/2438 |
| | | | 707/769 |
| 2013/0019225 A1* | 1/2013 | Peters | G06F 16/289 |
| | | | 717/121 |
| 2014/0250062 A1* | 9/2014 | Vroom | G06F 16/273 |
| | | | 707/618 |
| 2015/0178122 A1* | 6/2015 | Slavicek | G06F 16/256 |
| | | | 718/101 |
| 2019/0026090 A1* | 1/2019 | Madison | G06F 8/75 |
| 2019/0026330 A1* | 1/2019 | Gaier | G06F 9/4488 |
| 2020/0167374 A1* | 5/2020 | Schauder | G06F 16/244 |
| 2020/0394191 A1* | 12/2020 | Fender | G06F 16/24542 |

* cited by examiner

PROCESSING TECHNIQUES FOR DATABASE TRANSACTION REQUESTS WITH OPERATIONS DEFINED BY DIFFERENT ORM LIBRARIES

RELATED APPLICATIONS

The present application is a continuation of U.S. application Ser. No. 16/804,407, entitled "Processing Techniques for Database Transaction Requests with Operations Defined by Different ORM Libraries," filed Feb. 28, 2020, the disclosure of which is incorporated by reference herein in its entirety.

BACKGROUND

Technical Field

This disclosure relates generally to database transactions, and, more specifically, to techniques for managing database transactions with operations defined by different object relational mapping (ORM) libraries.

Description of the Related Art

An ORM library may be used within the data access layer (DAL) of an application to interface with databases using an object-oriented framework. For example, ORM libraries may allow a developer of an application to write database commands using program code at a higher level of abstraction. Specifically, a developer may generate a database transaction using Python commands instead of SQL commands. To provide for this level of abstraction, an ORM library may include mappings between Python objects specified by the application and tables included in a database. Traditionally, when an application initiates a database transaction, all operations included in the transaction are defined by the same ORM library. For example, an application may initiate a transaction whose operations are defined by a database abstraction layer (DBAL) library.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to translate application operations to database operations using one or more object relational mapping (ORMs) libraries" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented as a memory having program instructions stored therein that are executable by one or more processors to perform the operations. A module may be any suitable form of non-transitory computer readable media storing program instructions executable to perform specified operations.

DETAILED DESCRIPTION

Techniques are disclosed for processing database transactions that include application operations defined by different object relational mapping (ORM) libraries. In addition, the disclosed techniques provide for processing database transactions that include application operations that access different data sources. For example, in the context of an application that includes a Java persistence application programming interface (JPA) (one example of a persistence framework) in its data access layer (DAL), a request for a database transaction may include application operations defined by both a DBAL library (one example of an ORM library) and a hibernate library (another example of an ORM library). In this example, one of the DBAL-based operations may access data organized using a first database schema, while one of the hibernate-based operations may access data organized using a second database schema.

As used herein, the term "object relational mapping (ORM)" is intended to be construed according to its well-understood meaning, which includes converting data between incompatible type systems using object-oriented programming. For example, an ORM library may enable interfacing with databases using an object-oriented framework. Specifically, an ORM library may include mappings between Java objects specified by a Java application and one or more database tables. Note that an ORM library may also be referred to as an ORM application programming interface (API). Examples of ORM libraries include, without limitation: hibernate API, DBAL API, Spring Java database connectivity (JDBC) template, Java Data Objects (JDO), Data-Nucleus, etc.

As used herein, the term "data access layer (DAL)" is intended to be construed according to its well-understood meaning, which includes a layer of a computer program that provides simplified access to data stored in persistent storage. For example, the DAL may enable interfacing between an application and a database by performing a query to the database on behalf of the application and returning the results of the query to the application in the form of an application object (e.g., a Java object). The DAL of an application may be implemented using a persistence framework that includes one or more of the following: an ORM library, a database connection manager, a database connection pool, and a database driver. As one specific example, a DBAL-based application may include a DBAL ORM, a DBAL connection manager, a DBAL connection pool and a DBAL Oracle close callback (OCC) JDBC driver. As discussed above, in some situations, the DAL of an application may include a message broker framework such as ActiveMQ. In some cases, the persistence framework and the message broker framework include different ORM libraries. As used herein, "a database connection" is intended to be construed according to its well-understood meaning, which includes a path between an entity and a database that allows the entity to communicate with the database.

Traditional transaction processing techniques process database transactions that include application operations defined by the same ORM library. For example, database transactions may be initiated by an application that includes a DAL that supports a single persistency solution for managing these database transactions. In such situations, database transactions initiated by the application include application operations defined by a single ORM library. For example, the application may utilize a DBAL library when translating application operations to database operations for a particular transaction. In such situations, database transactions initiated by the application cannot include application operations defined by different ORM libraries. In addition, a database transaction initiated by the application cannot include operations for different data sources, but rather must execute all operations on the same data source.

In disclosed embodiments, database transactions that include operations defined by different ORM libraries may allow applications to implement newer persistence frameworks within their DAL in addition to legacy frameworks when requesting data from a database. For example, an application that is currently generating requests for database transactions using a DBAL library (an example legacy ORM library) may also begin to generate requests using a hibernate library (an example of a newer ORM library). In addition, disclosed techniques may address limitations faced by some JPA applications that use a hibernate library when attempting to use a message broker framework (e.g., Apache active message queuing (ActiveMQ)) that uses a DBAL library.

In some embodiments, a hybrid transaction manager determines database connections for operations of a particular database transaction request that are defined by different ORM libraries (and that may access different data sources). The disclosed techniques may allow applications to slowly transition from generating operations defined by a first ORM library to generating operations defined by various other ORM libraries when generating requests for database transactions. For example, an application that is currently generating operations defined by a DBAL library may begin generating operations defined by a hibernate library without changing all of the current database operations to hibernate-based operations in one shot. Further, the disclosed techniques may advantageously allow applications to switch between using different persistence frameworks and message broker frameworks, for example, within the same transaction context.

Example Multi-ORM System

Figure 1:
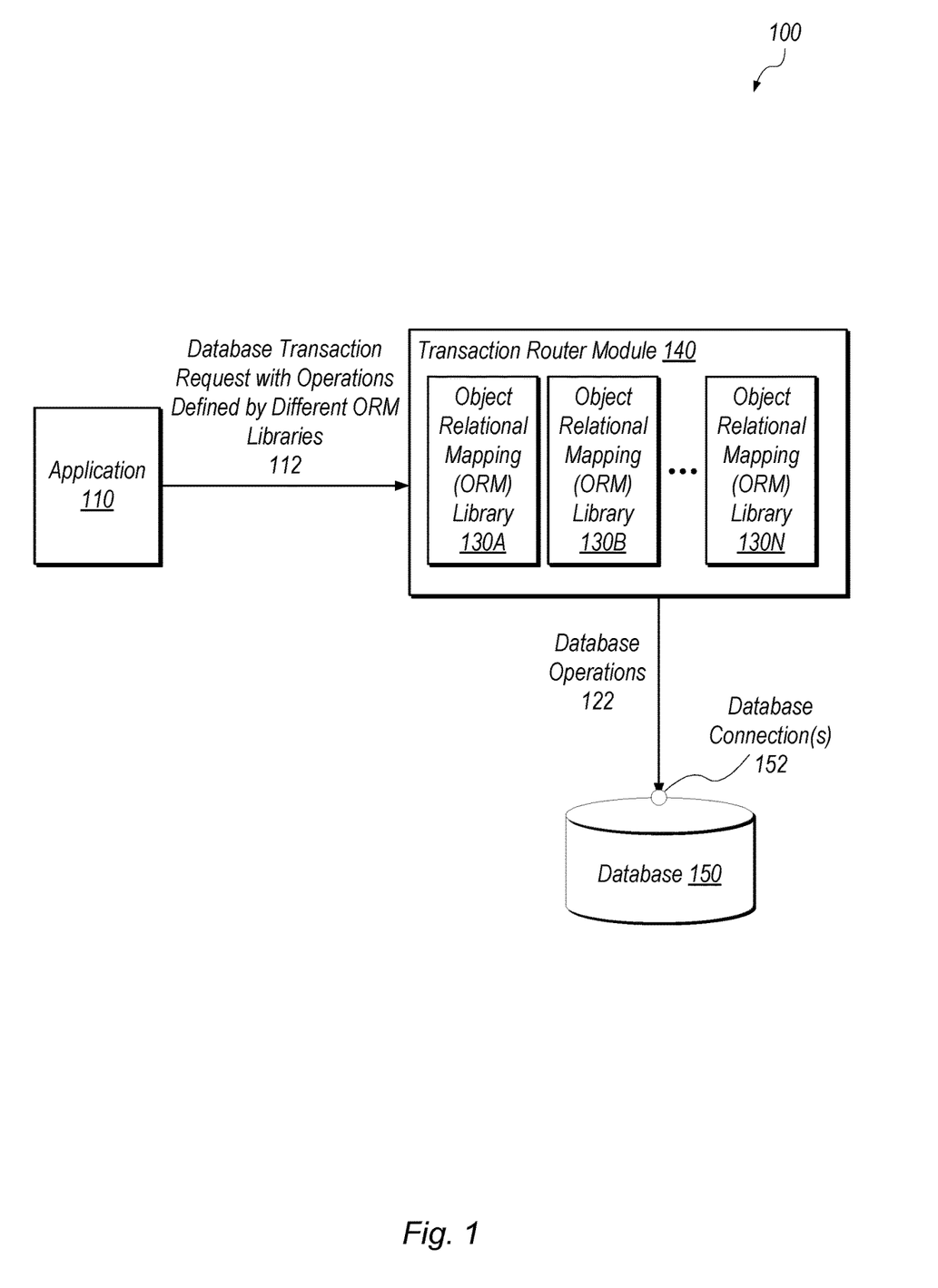
FIG. 1 is a block diagram illustrating an example system configured to determine database connections for operations that are defined by different object relational mapping (ORM) libraries, according to some embodiments.

Turning now to FIG. 1, a block diagram is shown illustrating an example system configured to determine database connections for operations that are defined by different ORM libraries. In the illustrated embodiment, system 100 includes or implements an application 110, a transaction router module 140, and a database 150.

Transaction router module 140, in the illustrated embodiment, receives a database transaction request 112 from application 110. This request 112 includes application operations defined by different ORM libraries. Each application operation may be in a format defined by an ORM library for translation to underlying database operations. Using multiple appropriate ORM libraries 130A-130N, transaction router module 140 is executable to translate application operations included in request 112 to database operations 122. For example, transaction router module 140 may use ORM 130A for a first set of operations defined by that library and ORM 120B for a second set of operations defined by that library. Database operations 122 may be data access operations (DAOs) for database 150. For example, database operations 122 may be DAOs that issue structured query language (SQL) statements to be executed in database 150. Example DAOs include: "findAll( )," "update( )" select( )," etc. Use of ORM libraries may allow applications to be ported to various different database implementations.

Transaction router module 140 may also be executable to select one or more connections 152 to database 150 for executing the database operations. Transaction router module 140 may be included in the DAL of an application 110 to abstract the complexity of a database by mapping application or business logic to database logic. For example, the database transaction request 112 may include one or more application operations that are written using business logic.

In some embodiments, transaction router module 140 is executable to use ORM libraries 130 to translate application operations (e.g., Java operations) included in the database transaction to database operations (e.g., SQL commands). As used herein, the term "database transaction" is intended to be construed according to its well-understood meaning, which includes an atomic unit of work performed by a system with respect to a database. Database operations may be described as atomic when they must be committed or rolled back as a single unit. For example, if a database transaction includes a "select( )" operations and an "insert ( )" operations, these operations must be committed or rolled back together.

Figure 2:
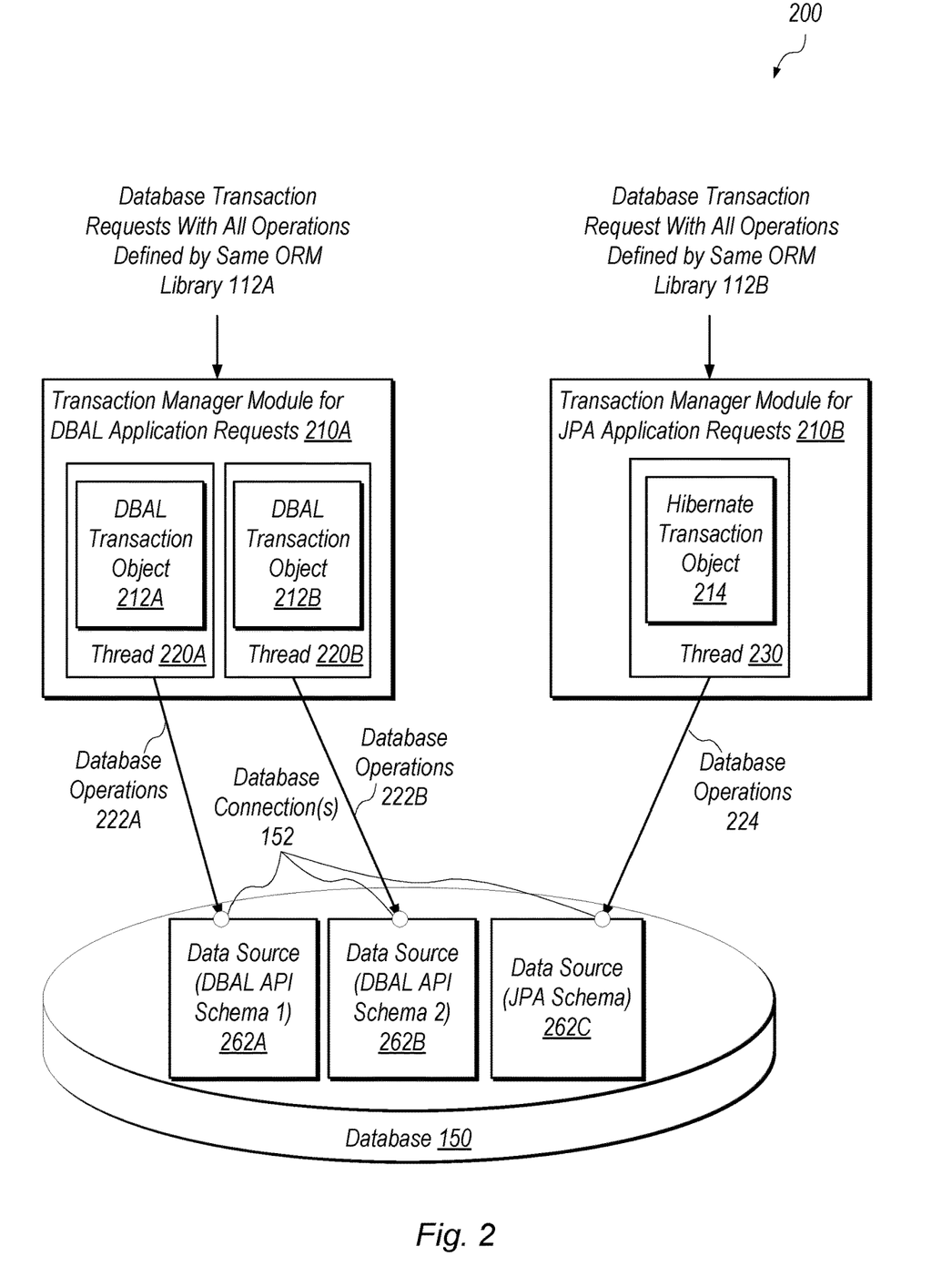
FIG. 2 is a block diagram illustrating an example system that processes only database transactions with operations that are all defined by the same ORM library, according to some embodiments.

FIG. 1 shows a transaction router module 140 that can process database transactions that include operations defined by different ORM libraries. To further illustrate the embodiment shown in FIG. 1, consider a system in which a transaction manager can only process database transactions whose operations are all defined by the same ORM library, as shown in FIG. 2. Further, in FIG. 2 two different transaction manager modules handle database transaction requests from an application implementing a DBAL API and an application implementing JPA, respectively. In contrast to the transaction router module 140 shown in FIG. 1, each transaction manager module illustrated in FIG. 2 is executable to process database transactions where all operations within a given transaction are defined by the same ORM libraries.

Example Single ORM System

FIG. 2 is a block diagram illustrating an example system that processes only database transactions with operations that are all defined by the same ORM library. In the illustrated embodiment, system 200 includes two transaction manager modules 210 for handling requests from DBAL applications and from JPA applications, respectively. In addition, system 200 includes various threads 220 for executing database transaction objects 212 and 214.

Transaction manager module 210A, in the illustrated embodiment, is executable to receive database transaction requests 112A from a DBAL application. DBAL applications may be applications that execute a DBAL API, for example. Each of these requests 112A include application operations that are all defined by the same ORM library. For example, transaction manager module 210A may translate all application operations included in a first database transaction using a DBAL library and may translate all application operations included in a second database transaction using a hibernate library. In addition to translating application operations specified in requests 112A, transaction manager module 210A initiates DBAL transaction objects 212 for respective database transactions. Transaction objects 212 each hold a connection to database 150. Transaction manager module 210A may rely on these objects 212, for example, to handle commits or rollbacks for their respective database transactions. Transaction manager module 210A, in the illustrated embodiment, executes DBAL transaction objects 212 using different threads 220. For example, DBAL transaction object 212A is executed within thread 220A, while DBAL transaction object 212B is executed within thread 220B. As used herein, the term "thread" is intended to be construed according to its well-understood meaning, which includes a set of instructions that are executed independently of other instructions. For example, multiple threads are often simultaneously executed within a computer program.

Transaction manager module 210A is also executable to select connections to data source 262A for database operations 222A included in object 212A. Similarly, transaction manager module 210A selects connections to data source 262B for database operations 222B included in object 212B. In some situations, the DBAL application specifies a different data source entry in its application configuration file for each data source accessed by the application. For example, the DBAL application may specify that data source 262A is a first database schema accessed by the application, while data source 262B is a second database schema accessed by the application. For example, the business logic of an application may specify to access these two data sources for a given transaction. These connections may be selected from a pool of database connections maintained for database 150 (and/or other databases). As used herein, the term "data source" refers to a structured set of persistent data that is stored and accessible. For example, a data source may be any type of durable storage, including without restriction: a database (e.g., an OLTP database), a database schema, a key-value store, a messaging system, etc.

Transaction manager module 210B, in the illustrated embodiment, is executable to receive a database transaction request 112B from JPA applications. In some situations, database transaction request 112B specifies application operations defined by a hibernate library. Transaction manager module 210B translates these application operations to database operations using a hibernate library and initiates a hibernate transaction object 214 for the database transaction. Transaction manager module 210B executes hibernate transaction object 214 within thread 230 by selecting a connection to data source 262C for hibernate transaction object 214. In the illustrated embodiment, transaction manager modules 210 handle transactions that include operations for a single data source. Therefore, in this example embodiment, different transaction managers handle different database transactions and within a given transaction all operations are defined by a single ORM library and are for a single data source.

Although FIG. 2 illustrates one database transaction processing embodiment, these techniques do not provide for processing database transactions that include operations defined by different ORM libraries. For example, the system shown in FIG. 2 may require an application that is currently generating operations defined by a DBAL library to change all of its current database operations to hibernate-based operations in a single shot, even in situations where the application is generating a single database transaction that includes operations defined by two different ORM libraries.

Figure 3:
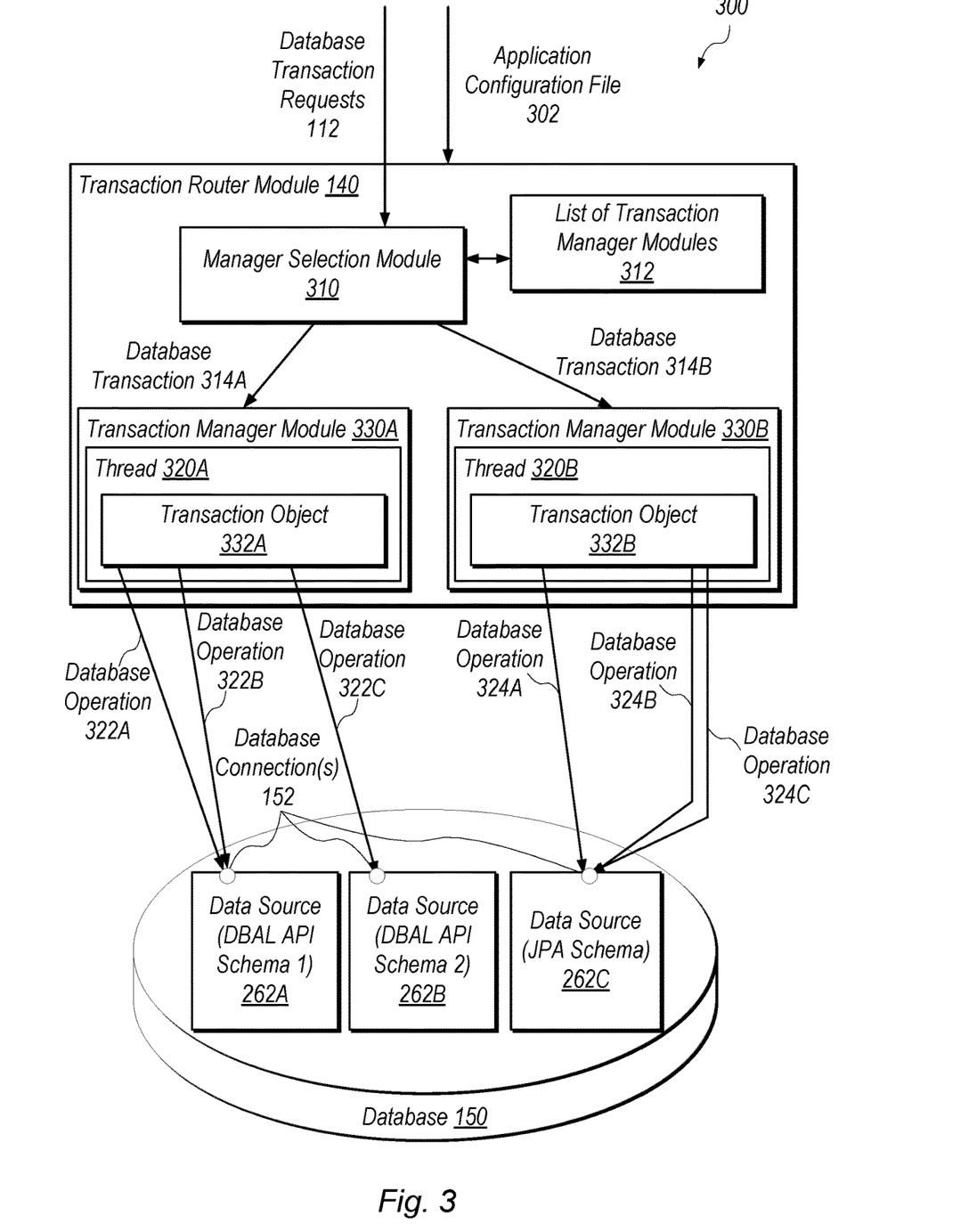
FIG. 3 is a block diagram illustrating an example transaction router module that includes multiple transaction manager modules, according to some embodiments.
Figure 4:
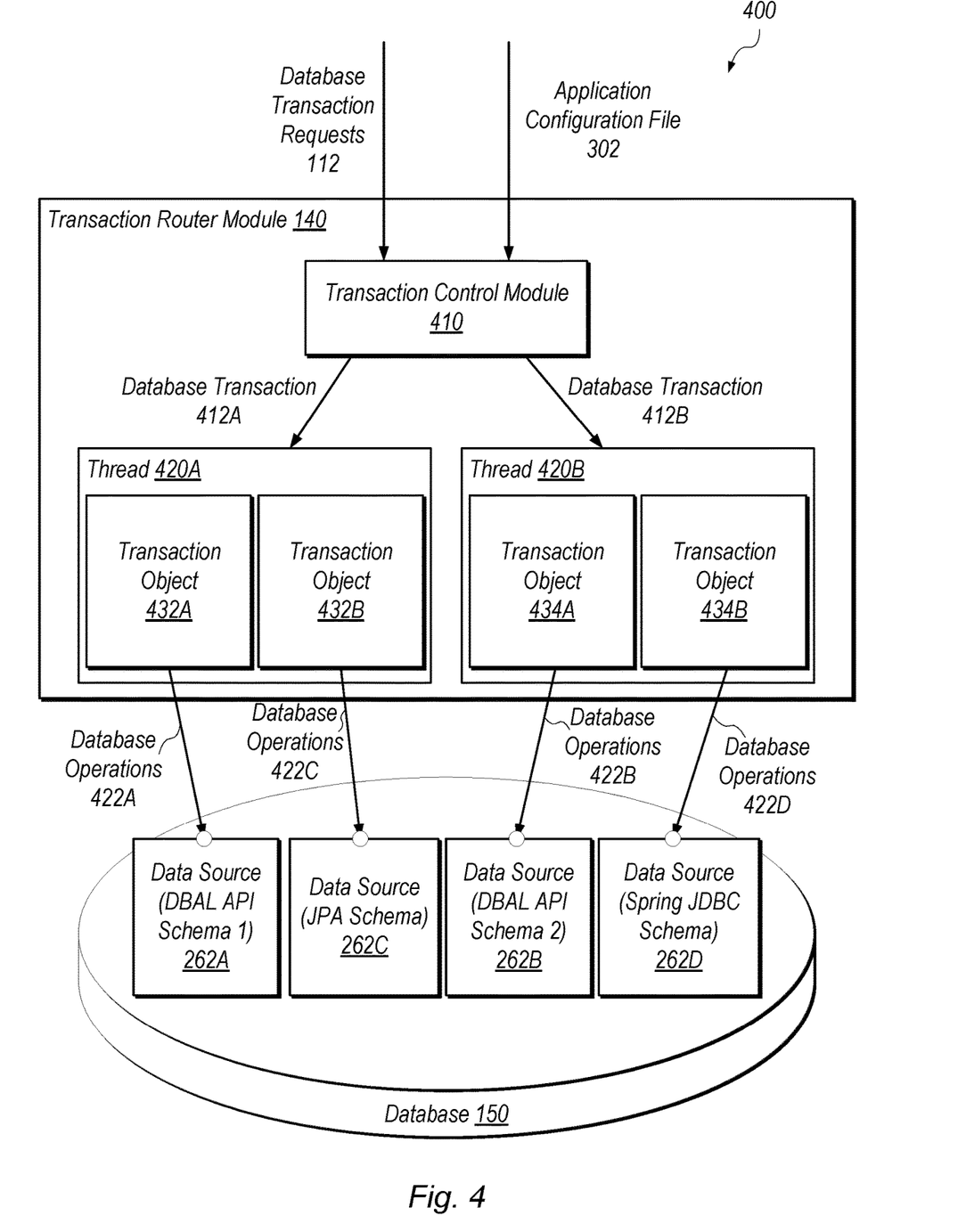
FIG. 4 is a block diagram illustrating an example transaction router module that handles multiple transaction objects per thread, according to some embodiments.

In contrast to FIG. 2, FIGS. 3 and 4 illustrate two different implementations of transaction router module 140, illustrated in FIG. 1, for handling database transactions that include application operations defined by different ORM libraries and that may access different data sources. For example, FIG. 3 illustrates an implementation in which transaction router module 140 uses multiple different transaction manager modules to process database transactions, while FIG. 4 illustrates an implementation in which transaction router module 140 processes database transactions without using multiple transaction manager modules. In addition, in the embodiment of FIG. 3, each transaction manager module handles a single transaction object per thread, while in the embodiment of FIG. 3 transaction router module 140 handles multiple transaction objects per thread. Further, in FIG. 3 each transaction object may use multiple database connections, while in FIG. 3 each transaction object uses only a single database connection.

Example Transaction Router Module

FIG. 3 is a block diagram illustrating an example transaction router module that includes multiple transaction manager modules. In the illustrated embodiment, system 300 includes a transaction router module 140 and a database 150. Transaction router module 140 in turn includes a manager selection module 310, a list 312 of transaction manager modules, and two different transaction manager modules 330.

Transaction router module 140, in the illustrated embodiment, is executable to receive database transaction requests 112 and an application configuration file 302 from application 110. Application configuration file 302 may be an extensible markup language (XML) file called dsimport.xml, for example. In some embodiments, at the startup of application 110, transaction router module 140 instantiates a transaction manager module 330 for each data source specified in the application configuration file 302 and maintains a list 312 of these modules. In the illustrated example, database transaction requests 112 include application operations defined by different ORM libraries. In addition, respective database transaction requests 112 may include operations for different data sources. As a result, transaction router module 140 selects different transaction manager module 330 for different database transaction requests 112 based on the data sources associated with those requests.

Manager selection module 310, in the illustrated embodiment, accesses list 312 of transaction manager modules and selects one or more transaction manager modules 330 based on the data sources specified in database transaction requests 112. Manager selection module 310 assigns a first database transaction 314A to transaction manager module 330A and a second database transaction 314B to transaction manager module 330B. In some embodiments, manager selection module 310 assigns a database transaction to a particular transaction manager module based on the data source accessed by the first operation included in the transaction. For example, list 312 may specify a mapping between the data source accessed by the first operation and the particular transaction manager module. In situations where a database transaction includes operations that access different data sources, the data source of the first operation will dictate which transaction manager module is assigned; however, the assigned transaction manager module will select different database connections, within a transaction object, for the operations based on their different data sources.

Transaction manager module 330A processes database transaction 214A using a single transaction object 332A within a single thread 320A, while transaction manager module 330B processes database transaction 314B using a single transaction object 332B within a single thread 320B.

Within thread 320A, transaction manager module 330A translates application operations included in database transaction 314A to database operations using different ORM libraries. For example, a first application operation included in database transaction 314A may be translated using a DBAL library to generate database operation 322A, while a second application operation included in database transaction 314A may be translated using a hibernate library. Further, in this example, transaction manager module 330A translates a third application operation included in database transaction 314A using the DBAL library to generate database operation 322C for data source 262B. Transaction manager module 330A, in the illustrated embodiment, selects a database connection to data source 262A for database operations 322A and 322B based on those database operations accessing this data source and selects a different database connection for data source 262B for database operations 322C based on this database operations accessing this data source. Database transaction 314A may include the following:

---
JPA Transaction.start( )
   Hibernate DB op1
   DBAL DB op2
   Hibernate DB op3
JPA Transaction.commit( ) or Rollback( )

---

In this example, transaction 314A is generated by a JPA application and includes operations defined by both hibernate and DBAL libraries. Further, in this example, hibernate database operation 1 and DBAL database operation 2 access a first data source, while hibernate database operation 3 accesses a second data source. Note that, in this example, operations defined by different ORM libraries access the same data source.

Similar to transaction manager module 330A, within thread 320B, transaction manager module 330B translates application operations included in database transaction 314B to database operations using different ORM libraries. For example, transaction manager module 330B may use a spring JDBC template and a hibernate library to translate application operations of database transaction 314B to database operations 324. Then, transaction manager module 330B selects a database connection for data source 262B (which is a JPA schema) for executing database operations 324. Transaction manager modules 330 execute individual transactions using a single thread. For example, transaction manager module 330A executes database operations 322 using a first thread, while transaction manager module 330B executes database operations 324 using a second thread. In addition, transaction manager modules 330 execute database operations 322 and database operations 324 using a single transaction object, respectively. Thus, in the example embodiment shown in FIG. 3 transaction manager modules 330 each hold a single transaction object per thread.

Turning now to FIG. 4, a block diagram is shown illustrating an example transaction router module 140 that handles multiple transactions objects per thread. In the illustrated embodiment, system 400 includes transaction router module 140, with transaction control module 410 and database 150.

Transaction control module 410, in the illustrated embodiment, is executable to receive database transaction requests 112 and application configuration file 302 from application 110. Module 410 translates application operations included in database transaction requests 112 using multiple appropriate ORM libraries to generate database transactions 412A and 412B. Module 410 then executes these database transactions 412 using two different threads 420.

Specifically, transaction router module 140 executes two different transaction objects 432A and 432B within thread 420A. Transaction module initiates objects 432 based on database transaction 412A including database operations for two different data sources. For example, transaction object 432A includes database operations 422A for data source 262A, while transaction object 432B includes database operations 422C for data source 262C. Database operations 422A may include data access objects (DAOs) that are initiated using both a DBAL library and a hibernate library and that access data source 262A.

Transaction control module 410 processes database transaction 412B by generating two different transaction objects 434A and 434B to handle database operations 422B for data source 262B and database operations 422D for data source 262D, respectively. Transaction router module 140 executes transaction objects 434 within the same application thread 420B.

As one specific example, database transaction 412B may include the following database operations: "DAO1.findAll ( );", "DAO2.selectByID( );", "DAO3.update( );". DAO1 accesses data source 262B, while DAO2 and DAO3 access data source 262D. As a result, in this example, transaction control module 410 initiates transaction object 434A for DAO1 and transaction object 434B for DAO2 and DAO3. In this example, transaction router module 140 manages two different database connections, one for each of data sources 262 and performs commits or rollbacks on the two different connections sequentially. Performance of commits or rollbacks may provide an application with more control over commit failures, for example.

The embodiment illustrated in FIG. 4 may provide more fine-grained control to owners of an application in terms of handling commit or rollback failures for database transactions on different data sources. In contrast, the embodiment illustrated in FIG. 3 may obscure the complexities of these failures from owners of the application initiating these database transactions. The embodiment illustrated in FIG. 3 may prevent errors from being introduced by the owner of an application, for example, in situations where the owner may miss invoking a commit or rollback for a particular transaction. Both of these embodiments, however, advantageously provide techniques for processing database transactions that includes operations defined by different ORM libraries and that may access different data sources.

Figure 5:
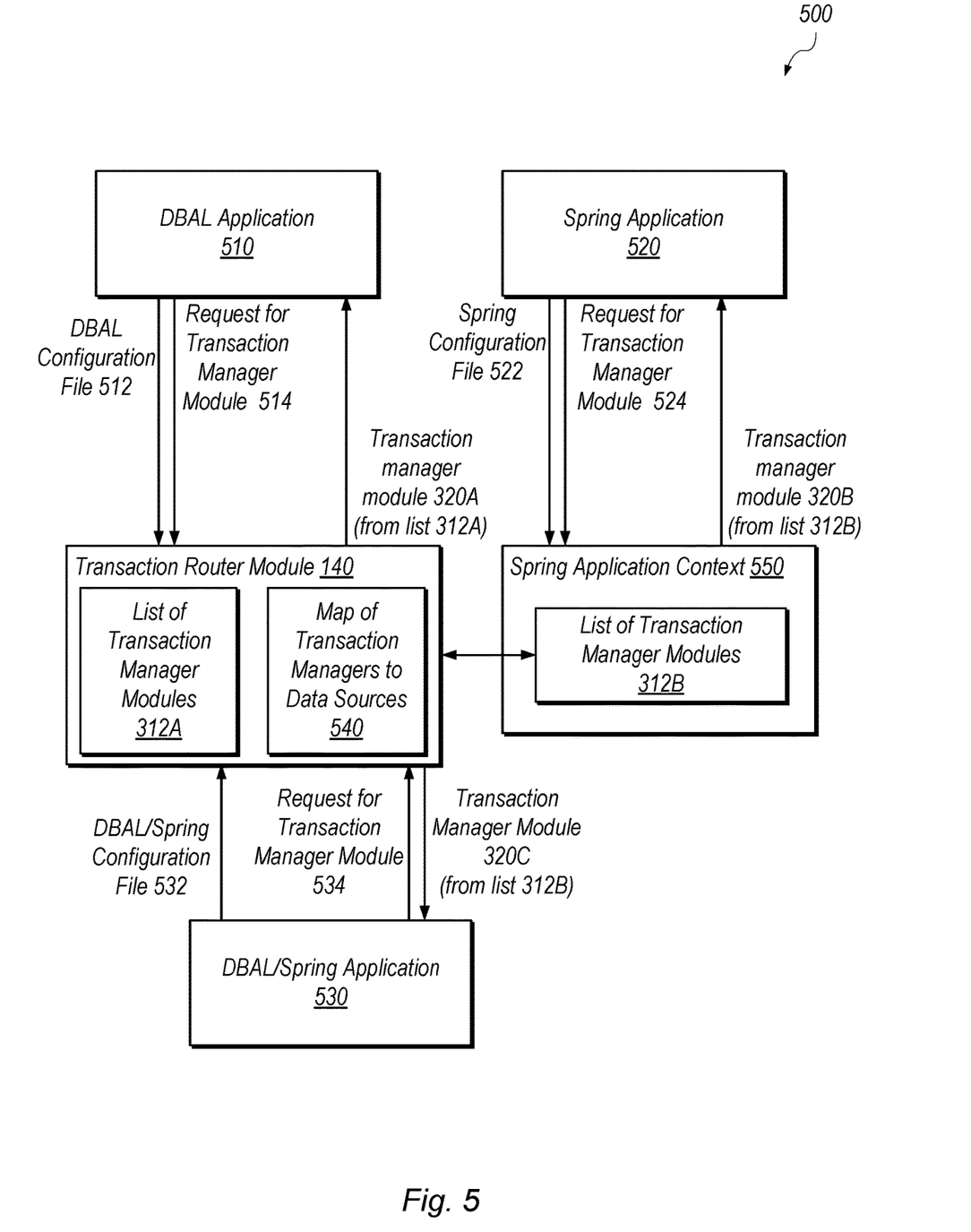
FIG. 5 is a block diagram illustrating example transaction management for applications implementing different types of data access layer (DAL) application programming interfaces (APIs), according to some embodiments.

Although FIGS. 3 and 4 illustrate two embodiments of database transaction processing by transaction router module 140, FIG. 5 illustrates and example interaction of the transaction router module with applications implementing different DAL frameworks. The techniques discussed with reference to FIG. 5 may advantageously allow multiple applications each implementing different DAL frameworks to interact with the same transaction router module 140 for processing database transactions.

Example DBAL and Spring Application Communication

Turning now to FIG. 5, a block diagram is shown illustrating example transaction management for applications implementing different types of DAL frameworks. In the illustrated embodiment, system 500 includes DBAL application 510, spring application 520, and DBAL/spring application 530. Application 510 uses the DBAL framework, application 520 uses the spring framework, and application 530 uses both frameworks. For example, while application 510 uses DBAL DAOs and application 520 uses spring DAOs, application 530 uses both DBAL and spring DAOs. Note that applications 510, 520, and 530 are examples of application 110 shown in FIG. 1.

At initialization, DBAL application 510 provides DBAL configuration file 512 to transaction router module 140. Based on one or more data sources specified in DBAL configuration file 512, transaction router module 140 generates transaction manager modules and stores a local list 312A of transaction manager modules that includes a map of data source names to transaction manager modules, as well as information 540 mapping transaction manager modules to their respective data sources based on the different data source names.

Spring application 520 provides spring configuration file 522 to spring application context 550, in the illustrated embodiment. Spring application context 550 then generates transaction manager modules for data sources specified in file 522 and maintains a list 312B of these transaction manager modules.

DBAL/spring Application 530, in the illustrated embodiment, provides DBAL/spring configuration file 532 to transaction router module 140. Based on the data sources specified in file 532, transaction router module 140 updates the local list 312A of transaction manager modules. For example, transaction router module 140 may generate additional transaction manager modules for new data sources listed in file 532 and may add a map of these additional transaction manager modules to the new data source names to information 540.

Transaction router module 140 receives requests 514 and 534 from applications 510 and 530, respectively. After receiving request 514 from DBAL application 510, transaction router module 140 checks whether spring application context 550 is available to this application. Since application 510 is a DBAL application, spring application context 550 is not available and, as such, transaction router module 140 provides a transaction manager module 330A from list 312A to application 510. After receiving request 534 from application 530, transaction router module 140 accesses spring application context 550 to obtain transaction manager module 330C from list 312B based on application 530 implementing the spring framework and, therefore, having access to the spring application context. Spring application context 550, after receiving request 524 from spring application 520, selects transaction manager module 330B from list 312B and provides this module to spring application 520 for managing a transaction. The system shown in FIG. 5 illustrates, for example, that transaction router module 140 is executable to interact with existing applications such as applications 510 and 520 as well as new, hybrid transactions such as application 530.

Example Methods

Figure 6:
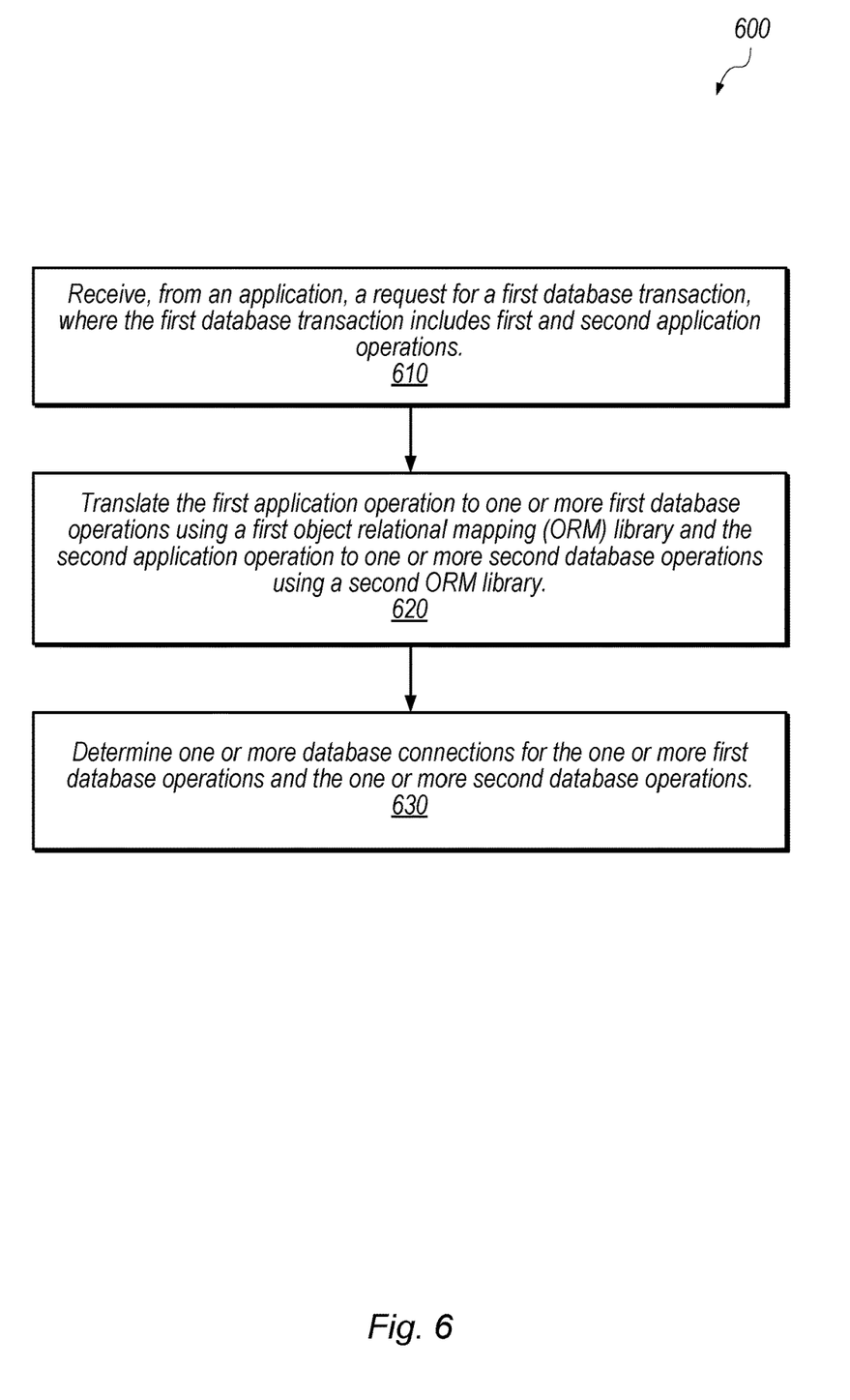
FIG. 6 is a flow diagram illustrating a method for processing database transactions with operations defined by different ORM libraries, according to some embodiments.

FIG. 6 is a flow diagram illustrating a method for processing database transactions with operations defined by different ORM libraries according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a transaction router module receives, from an application, a request for a first database transaction, where the first database transaction includes first and second application operations. In some embodiments, the request for the first database transaction generated using a data access layer (DAL) application programming interface (API), where a configuration file of the DAL API specified one or more database schemas.

At 620, the transaction router module translates the first application operation to one or more first database operations using a first object relational mapping (ORM) library and the second application operation to one or more second database operations using a second ORM library. In some embodiments, the first ORM library is a database abstraction layer (DBAL) library, and wherein the second ORM library is a hibernate library.

In some embodiments, the transaction router module accesses mapping information that specifies mappings between data sources and transaction manager modules in a set of transaction manager modules included in the transaction router module. In some embodiments, the transaction router module selects a transaction manager module to process the first database transaction based on a data source of the first database transaction and the mapping information. In some embodiments, the selected transaction manager module accesses different data sources for the first and second database operations using database connections corresponding to the different data sources.

In some embodiments, the transaction router module receives a configuration file that specifies one or more data sources accessed by the application. In some embodiments, the transaction router module generates, based on the specified one or more data sources, the set of transaction manager modules and the mapping information. In some embodiments, a first data source specified in the first database transaction is organized according to a first database schema, and wherein a second data source specified in the first database transaction is organized according to a second database schema. In some embodiments, a first data source specified in the first database transaction is a first database and wherein a second data source specified in the first database transaction is a second, different database.

At 630, the transaction router module determines one or more database connections for the one or more first database operations and the one or more second database operations. In some embodiments, the transaction router module accesses, based on the determined database connections, a first data source for the one or more first database operations and a second data source for the one or more second database operations.

In some embodiments, the transaction router module processes, using different threads, multiple requests for different database transactions that access different data sources, where the processing includes generating multiple transaction objects for the first database transaction. In some embodiments, the processing includes accessing, by the transaction router module, different data sources for respective transaction objects initiated for the first database transaction. In some embodiments, the multiple requests for different database transactions are generated using different data access layer (DAL) application programming interfaces (APIs) that include different corresponding ORM libraries.

In some embodiments, the transaction router module receives transaction requests from first and second applications using different DAL APIs. In some embodiments, the transaction router module determines, for the first and second application, whether a first list of transaction manager modules is available to the applications. In some embodiments, the transaction router module accesses, based on the determining, one of the first list of transaction manager modules and a second list of transaction manager modules.

Example Computing Device

Figure 7:
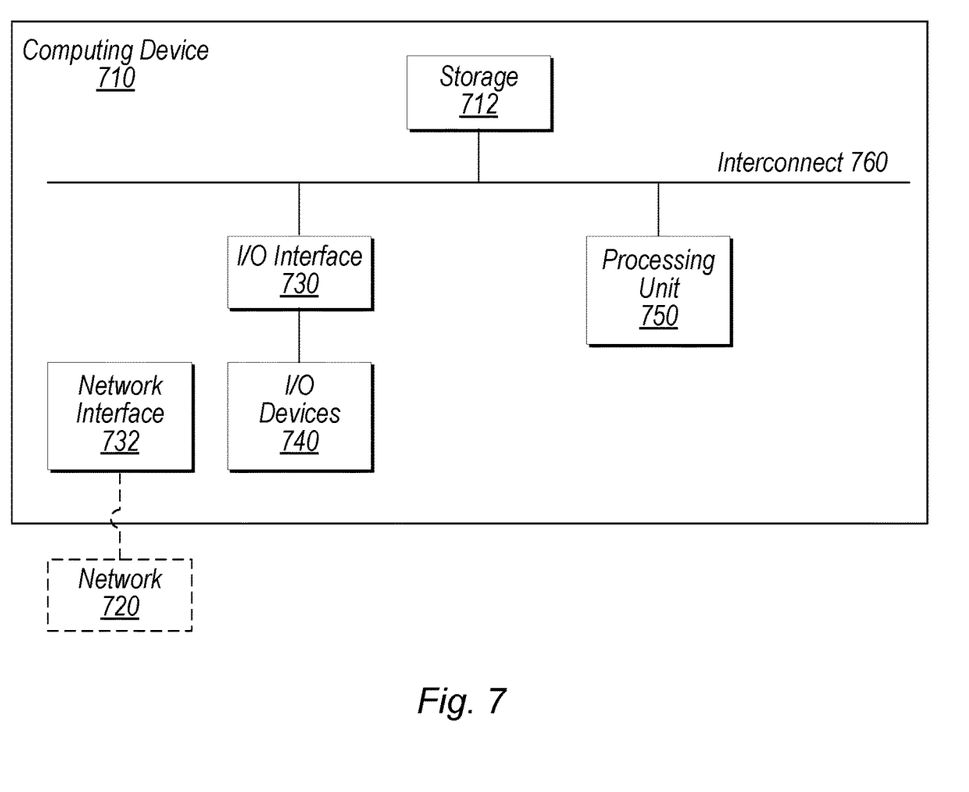
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method related to translation of database transaction application operations specified in at least one of a first programming language and a second, different programming language, comprising:
    receiving, by a computer system, a request for a first database transaction and a request for a second database transaction;
    translating, by the computer system, one or more application operations included in the first database transaction and specified in the first programming language to one or more first database operations;
    translating, by the computer system, one or more application operations included in the second database transaction and specified in the second, different programming language to one or more second database operations, wherein the computer system is configured to translate application operations that are defined using different object relational mappings (ORMs) to database operations; and
    determining, by the computer system, one or more database connections for the one or more first database operations and the one or more second database operations.

2. The method of claim 1, wherein the request for the first database transaction is received from a first application and the request for the second database transaction is received from a second, different application.

3. The method of claim 1, further comprising:
    accessing, by the computer system, mapping information that specifies mappings between data sources and transaction manager modules in a set of transaction manager modules included in the computer system; and
    selecting, by the computer system, a transaction manager module to process the first database transaction based on a data source of the first database transaction and the mapping information, wherein the selected transaction manager module is configured to accesses access different data sources for the first and second database operations using database connections corresponding to the different data sources.

4. The method of claim 3, wherein prior to selecting the transaction manager module to process the first database transaction, the method further comprises:
    receiving, by the computer system, a configuration file that specifies one or more data sources accessed by an application corresponding to at least one of the request for the first database transaction and the request for the second database transaction;
    generating, by the computer system based on the one or more data sources specified in the configuration file, the set of transaction manager modules and the mapping information; and
    storing, by the computer system, a local list specifying a map of data source names to transaction manager modules included in the set of transaction manager modules.

5. The method of claim 2, wherein a first data source specified in the first database transaction is organized according to a first database schema, and wherein a second data source specified in the first database transaction is organized according to a second database schema.

6. The method of claim 1, further comprising:
    processing, by the computer system using different threads, multiple requests for different database transactions that access different data sources, wherein the processing includes generating multiple transaction objects for the first database transaction, and wherein the multiple requests for different database transactions are generated using different data access layer (DAL) application programming interfaces (APIs) that include different corresponding ORM libraries.

7. The method of claim 1, wherein determining the one or more database connections includes:
    selecting, from an existing pool of database connections maintained by a database of the computer system, the one or more database connections.

8. The method of claim 1, further comprising:
    receiving, by the computer system, transaction requests from first and second applications using different data access layer (DAL) application programming interfaces (APIs);
    determining, by the computer system for the first and second applications, whether a first list of transaction manager modules is available to the applications; and
    accessing, by the computer system based on the determining, one of the first list of transaction manager modules and a second list of transaction manager modules.

9. A non-transitory computer-readable medium having instructions stored thereon that are executable by a computing system to perform operations for translating database transaction application operations specified in at least one of a first programming language and a second, different programming language, the operations comprising:
    receiving a request for a first database transaction and a request for a second database transaction;
    translating one or more application operations included in the first database transaction that are defined by a first object relational mapping (ORM) and specified in the first programming language to one or more first database operations;
    translating one or more application operations included in the second database transaction that are defined by a second ORM and specified in the second, different programming language to one or more second database operations; and
    determining, by the computer system, one or more database connections for the one or more first database operations and the one or more second database operations.

10. The non-transitory computer-readable medium of claim 9, wherein the request for the first database transaction is received from a first application and the request for the second database transaction is received from a second, different application.

11. The non-transitory computer-readable medium of claim 9, wherein the operations further comprise:
    accessing mapping information that specifies mappings between data sources and transaction manager modules in a set of transaction manager modules; and
    selecting a transaction manager module to process the first database transaction based on a data source of the first database transaction and the mapping information, wherein the selected transaction manager module accesses different data sources for the first and second database operations using database connections corresponding to the different data sources.

12. The non-transitory computer-readable medium of claim 11, wherein prior to selecting the transaction manager module to process the first database transaction the operations further comprise:
    receiving a configuration file that specifies one or more data sources accessed by an application corresponding to at least one of the request for the first database transaction and the request for the second database transaction; and
    generating, based on the one or more data sources specified in the configuration file, the set of transaction manager modules and the mapping information.

13. The non-transitory computer-readable medium of claim 12, wherein the operations further comprise:
    storing a local list specifying a map of data source names to transaction manager modules included in the set of transaction manager modules.

14. The non-transitory computer-readable medium of claim 9, wherein the operations further comprise:
    processing, using different threads, multiple requests for different database transactions that access different data sources, wherein the processing includes generating multiple transaction objects for the first database transaction.

15. The non-transitory computer-readable medium of claim 9, wherein the operations further comprise:
    receiving transaction requests from first and second applications using different data access layer (DAL) application programming interfaces (APIs);
    determining, for the first and second applications, whether a first list of transaction manager modules is available to the applications; and
    accessing, based on the determining, one of the first list of transaction manager modules and a second list of transaction manager modules.

16. A system, comprising:
    at least one processor; and
    a memory having instructions stored thereon that are executable by the at least one processor to cause the system to:
        receive a request for a first database transaction and a request for a second database transaction;
        translate one or more application operations included in the first database transaction that are defined by a first set of object relational mappings (ORMs) to one or more first database operations;
        translate one or more application operations included in the second database transaction that are defined by a second set of ORMs to one or more second database operations, wherein the system is configured to translate database transactions that are specified in different programming languages; and
        identify one or more database connections for the one or more first database operations and the one or more second database operations.

17. The system of claim 16, wherein the instructions are further executable by the at least one processor to cause the system to:
    access mapping information that specifies mappings between data sources and transaction manager modules in a set of transaction manager modules included in a transaction router module executed by the system; and
    select a transaction manager module to process the first database transaction based on a data source of the first database transaction and the mapping information.

18. The system of claim 16, wherein the instructions are further executable by the at least one processor to cause the system to:
    process, using different threads, multiple requests for different database transactions that access different data sources, wherein the processing includes generating multiple transaction objects for the first database transaction, and wherein the request for the first database transaction is generated using a data access layer (DAL) application programming interface (API), and wherein a configuration file of the DAL API specifies one or more database schemas.

19. The system of claim 16, wherein the request for the first database transaction is received from a first application and the request for the second database transaction is received from a second, different application.

20. The system of claim 16, wherein the first set of ORMs is a database abstraction layer (DBAL) library, and wherein the second set of ORMs is a hibernate library.

* * * * *

UNITED STATES PATENT AND TRADEMARK OFFICE
CERTIFICATE OF CORRECTION

PATENT NO. : 11,874,858 B2
APPLICATION NO. : 17/931167
DATED : January 16, 2024
INVENTOR(S) : Rajasudharsan Adhikesavan et al.

It is certified that error appears in the above-identified patent and that said Letters Patent is hereby corrected as shown below:

In the Claims

In Column 13 (Claim 3), Line 58, please delete "configured to accesses access" and insert
-- configured to access --.

Signed and Sealed this
Thirteenth Day of February, 2024

Katherine Kelly Vidal
Director of the United States Patent and Trademark Office